United States Patent
Lu

(10) Patent No.: US 12,457,348 B2
(45) Date of Patent: Oct. 28, 2025

(54) APPARATUS AND METHOD FOR ENCODING AND DECODING BAYER PATTERN IMAGES

(71) Applicant: ASPEED Technology Inc., Hsinchu (TW)

(72) Inventor: Chung-Yen Lu, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 84 days.

(21) Appl. No.: 18/414,668

(22) Filed: Jan. 17, 2024

(65) Prior Publication Data

US 2025/0234021 A1    Jul. 17, 2025

(51) Int. Cl.
*H04N 19/42* (2014.01)
*H04N 19/124* (2014.01)
*H04N 19/167* (2014.01)
*H04N 19/169* (2014.01)
*H04N 19/182* (2014.01)
*H04N 19/50* (2014.01)

(52) U.S. Cl.
CPC ......... *H04N 19/42* (2014.11); *H04N 19/124* (2014.11); *H04N 19/167* (2014.11); *H04N 19/182* (2014.11); *H04N 19/1887* (2014.11); *H04N 19/50* (2014.11)

(58) Field of Classification Search
CPC ..................................... H04N 19/42
USPC ..................................... 375/240.03
See application file for complete search history.

(56) References Cited

U.S. PATENT DOCUMENTS

| | | | |
|---|---|---|---|
| 7,545,293 B2 | 6/2009 | Reznik | |
| 9,510,020 B2* | 11/2016 | Van der Auwera | H04N 19/117 |
| 12,231,624 B2 | 2/2025 | Filippov et al. | |
| 2008/0111721 A1* | 5/2008 | Reznik | H03M 7/40 |
| | | | 341/67 |
| 2008/0111722 A1* | 5/2008 | Reznik | H03M 7/40 |
| | | | 341/67 |
| 2009/0067734 A1 | 3/2009 | Kalevo | |
| 2020/0186284 A1* | 6/2020 | Noh | H04L 1/00 |

FOREIGN PATENT DOCUMENTS

| | | |
|---|---|---|
| CN | 101578769 B | 11/2009 |
| CN | 112889281 B | 6/2021 |

* cited by examiner

*Primary Examiner* — Yulin Sun
(74) *Attorney, Agent, or Firm* — MUNCY, GEISSLER, OLDS & LOWE, P.C.

(57) ABSTRACT

A video encoding apparatus for Bayer pattern images is disclosed, comprising: a quantizer, a variable-length coder and a predictor. The quantizer is configured to perform quantization over a difference value D between an input pixel and a current predicted pixel to generate a quantized value $\Delta$ in a quantization sequence based on a quantization parameter Q and the following equation: $\Delta = \lfloor (|D| + \lfloor Q/2 \rfloor + 1) \times A/N \rfloor$. The variable-length coder is configured to count a number ZR of consecutive zeros that either precede a following non-zero integer in the quantization sequence or are arranged in the end of the quantization sequence, to encode the number ZR of consecutive zeros into a first codeword by a first codeword set, and to encode the following non-zero integer into a second codeword by a second codeword set to produce an encoded bitstream.

28 Claims, 5 Drawing Sheets

| N\Q | (n=8) 256 | (n=10) 1024 | (n=12) 4096 | (n=14) 16384 | (n=16) 65536 |
|---|---|---|---|---|---|
| 3 | A=85 | A=341 | A=1365 | A=5461 | A=21845 |
| 5 | A=51 | X | A=819 | X | A=13107 |
| 7 | X | X | A=585 | X | |
| 9 | X | X | A=455 | X | X |
| 15 | A=17 | X | A=273 | X | A=4369 |
| 17 | A=15 | X | X | X | A=3855 |

X: not supported

FIG. 3

| D | -3 | -2 | -1 | 0 | 1 | 2 | 3 | 4 | 5 | 6 | 7 | 8 | 9 | 10 | 11 | 12 | 13 | 14 | | | |
|---|---|---|---|---|---|---|---|---|---|---|---|---|---|---|---|---|---|---|---|---|---|
| $\lfloor D/Q \rfloor$ | -1 | 0 | 0 | 0 | 0 | 0 | 1 | 1 | 1 | 2 | 2 | 2 | 3 | 3 | 3 | 4 | 4 | 4 | • | • | • |
| Equation 2 | -1 | -1 | 0 | 0 | 0 | 1 | 1 | 1 | 2 | 2 | 2 | 3 | 3 | 3 | 4 | 4 | 4 | 4 | | | |
| Equation 3 | -1 | 0 | 0 | 0 | 0 | 1 | 1 | 1 | 2 | 2 | 2 | 3 | 3 | 3 | 4 | 4 | 4 | 5 | | | |
| Equation 1 | -1 | -1 | 0 | 0 | 0 | 1 | 1 | 1 | 2 | 2 | 2 | 3 | 3 | 3 | 4 | 4 | 4 | 5 | | | |

Q=3

Equation 2 = $\pm \lfloor (|D| + \lfloor Q/2 \rfloor)/Q \rfloor$

Equation 3 (conventional) = $\pm \lfloor (|D| + \lfloor Q/2 \rfloor) * 341/1024 \rfloor$ Equation 1 (the invention) = $\pm \lfloor (|D| + \lfloor Q/2 \rfloor + 1) * 1365/4096 \rfloor$ /*The signs of the calculation results correspond to the signs of Ds */

FIG. 4

APPARATUS AND METHOD FOR ENCODING AND DECODING BAYER PATTERN IMAGES

BACKGROUND OF THE INVENTION

Field of the Invention

The invention relates to video codec, and more particularly, to apparatus and method for encoding and decoding Bayer pattern images.

Description of the Related Art

An image signal processor (ISP) is a specialized component in digital cameras, smartphones and other imaging systems. Its primary function is to process raw output data (hereinafter called "Bayer pattern image") from Bayer color filter array (CFA) and convert it into a high-quality image. The ISP obtains low/standard dynamic range (LSDR) images (with each pixel having only one color) derived from the Bayer pattern images before demosaicing. At this stage, the ISP can generate a high dynamic range (HDR) image by merging a series of LSDR images with different exposure times. Since the LSDR images are taken/captured at different time stamps, the LSDR images are sequentially compressed and stored in DRAM. Later, the compressed data are read back from DRAM, decompressed and merged for generation of the HDR images. Hence, a need exists for a lossless compression scheme that enables the compressed data to take up less space in memory without any discernible loss in picture quality.

SUMMARY OF THE INVENTION

In view of the above-mentioned problems, an object of the invention is to provide a video encoding apparatus for Bayer pattern images that enables the compressed data to take up less space in memory without any discernible loss in picture quality.

One embodiment of the invention provides a video encoding apparatus for Bayer pattern images. The apparatus comprises a quantizer, a variable-length coder and a predictor. The quantizer is configured to perform quantization over a difference value D between an input pixel and a current predicted pixel to generate a quantized value $\Delta$ in a quantization sequence based on a quantization parameter Q and the following equation: $\Delta = \lfloor (|D| + \lfloor Q/2 \rfloor + 1) \times A/N \rfloor$. The predictor coupled to the quantizer is configured to perform a set of first operations comprising: providing a current predicted pixel according to a position of a current segment in a current Bayer pattern image. The variable-length coder coupled to the quantizer is configured to perform a set of second operations comprising: (1) counting a number ZR of consecutive zeros that either precede a following non-zero integer in the quantization sequence or are arranged in the end of the quantization sequence; (2) encoding the number ZR of consecutive zeros into a first codeword by a first codeword set; (3) encoding the following non-zero integer into a second codeword by a second codeword set; (4) repeating the second operations of (1) to (3) until all the values in the quantization sequence are processed to produce an encoded bitstream. Here, A satisfies the following equation: $(Q \times A + 1) = N$, where $N = 2^d \geq 2^n$, n denotes a bit width of the input pixel and d is an integer.

Another embodiment of the invention provides video encoding method for Bayer pattern images, comprising the steps of: performing quantization over a difference value D between an input pixel and a current predicted pixel to generate a quantized value $\Delta$ in a quantization sequence based on a quantization parameter Q and the following equation: $\Delta = \lfloor (|D| + \lfloor Q/2 \rfloor + 1) \times A/N \rfloor$; providing a current predicted pixel according to a position of a current segment in a current Bayer pattern image; counting a number ZR of consecutive zeros that either precede a following non-zero integer in the quantization sequence or are arranged in the end of the quantization sequence; encoding the number ZR of consecutive zeros into a first codeword by a first codeword set; encoding the following non-zero integer into a second codeword by a second codeword set; and repeating the operations of counting, encoding the number ZR of consecutive zeros and encoding the following non-zero integer until all the values in the quantization sequence are processed to produce an encoded bitstream. Here, A satisfies the following equation: $(Q \times A + 1) = N$, where $N = 2^d \geq 2^n$, n denotes a bit width of the input pixel and d is an integer.

One embodiment of the invention provides a video decoding apparatus for Bayer pattern images. The apparatus comprises a variable-length decoder and a predictor. The variable-length decoder is configured to perform a set of first operations comprising: comparing a front bit pattern in an encoded bitstream with all codewords of a first codeword set and a second codeword set in an alternate manner to generate a decoded numeral being either a group of consecutive zeros or a nonzero integer. The predictor coupled to the variable-length decoder is configured to perform a set of second operations comprising: providing a current predicted pixel according to a position of a current reconstructed segment in a current reconstructed Bayer pattern image.

Another embodiment of the invention provides video decoding method for Bayer pattern images, comprising the steps of: comparing a front bit pattern in an encoded bitstream with all codewords of a first codeword set and a second codeword set in an alternate manner to generate a decoded numeral being either a group of consecutive zeros or a nonzero integer; and, providing a current predicted pixel according to a position of a current reconstructed segment in a current reconstructed Bayer pattern image.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 shows a relationship among the values of N, Q and A.

FIG. 4 shows a portion (the D value ranging from −3 to 14) of calculation results of different equations with the same quantization step/parameter Q=3.

DETAILED DESCRIPTION OF THE INVENTION

Figure 1:
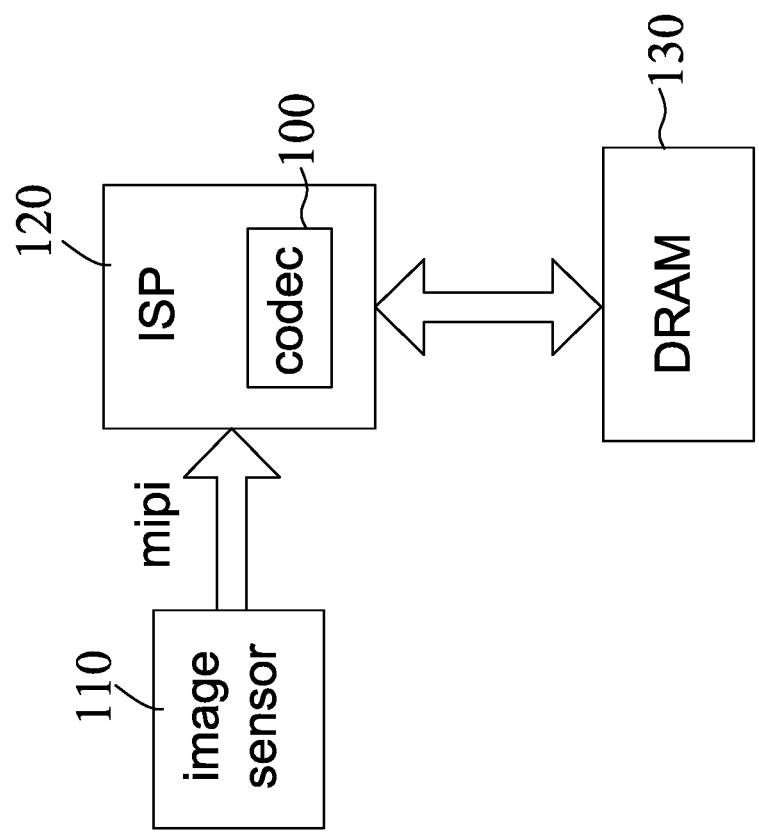
FIG. 1 is an exemplary diagram showing an arrangement of a codec system 100 according to an embodiment of the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

Please note that in the following arrangements for a codec system 100 embedded in an ISP 120 are only utilized as embodiments, and are not limitations of the invention. In the actual implementations, any other arrangements for the codec system 100, such as embedded in any other image processing devices, can be used and this also falls in the scope of the invention.

FIG. 1 is an exemplary diagram showing an arrangement of a codec system 100 according to an embodiment of the invention. Referring to FIG. 1, the codec system 100 is embedded in an ISP 120 of an imaging system, such as a digital camera. The ISP 120 receives the Bayer pattern images from the image sensor 110 (e.g., Bayer CFA), and selectively performs none or more processes of denoising, white balancing, color transform, exposure correction and gamma correction to produce LSDR images before demosaicing. In the LSDR images, each pixel has only one color represented by 8, 10, 12, 14, or 16 bits of data (i.e., bit width). Since the LSDR images are taken/captured at different time stamps, the LSDR images are sequentially compressed by the codec system 100 and then stored in DRAM 130. Then, the compressed data are read back from DRAM 130, decompressed by the codec system 100 and merged by the ISP 120 for generation of the HDR images. The codec system 100 in the embodiment of FIG. 1 includes a segment encoder 200 in FIG. 2 and a segment decoder 500 in FIG. 5 and both the segment encoder 200 and the segment decoder 500 are arranged in the ISP 120. In an alternative embodiment, the segment encoder 200 and the segment decoder 500 are separately arranged in two different imaging devices/systems.

Figure 2:
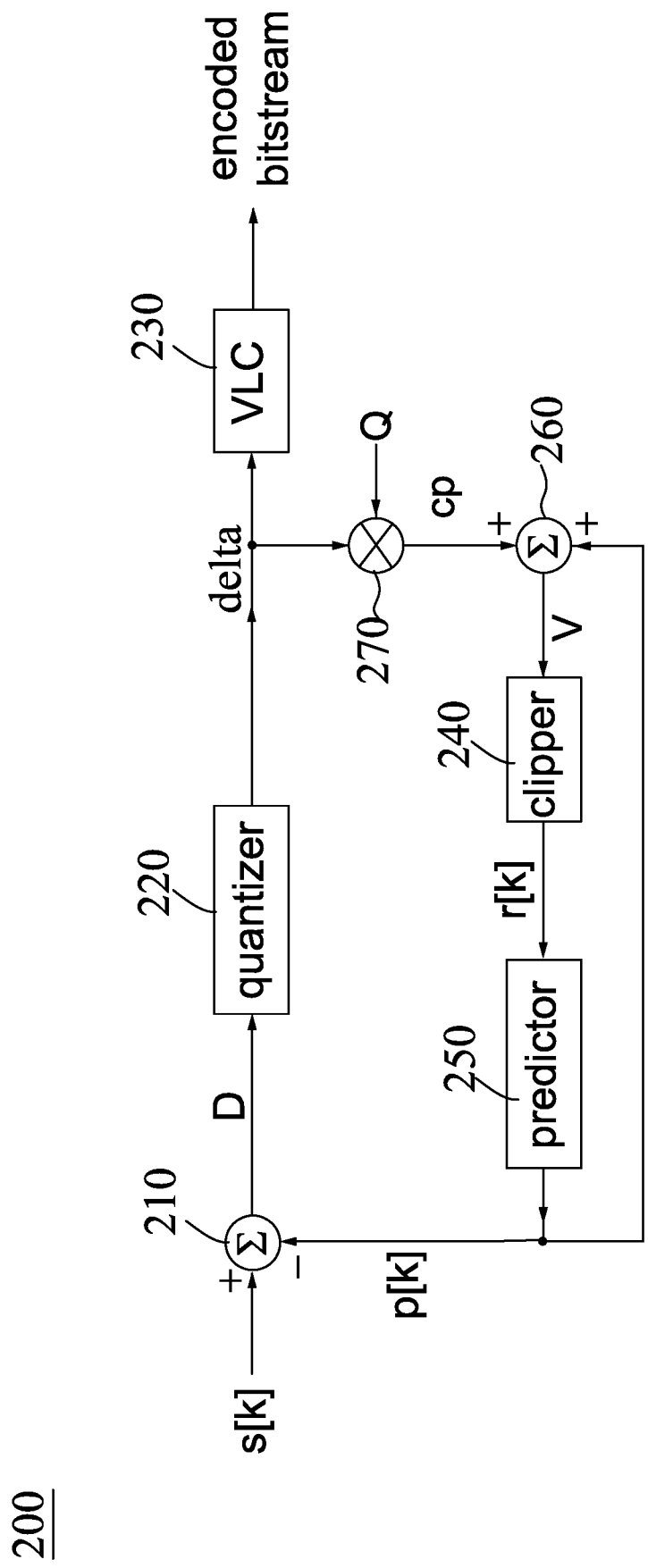
FIG. 2 is a schematic diagram showing a segment encoder 200 for Bayer pattern images according to an embodiment of the invention.

FIG. 2 is a schematic diagram showing a segment encoder 200 for Bayer pattern images according to an embodiment of the invention. Referring to FIG. 2, the segment encoder 200 of the invention includes a subtractor 210, a quantizer 220, a variable length coder (VLC) 230, a clipper 240, a predictor 250, an adder 260 and a multiplier 270. Generally, each LSDR image is divided into multiple segments and then sequentially fed to the segment encoder 200 on a segment-by-segment basis and on a pixel-by-pixel basis. The operations of the segment encoder 200 and the segment decoder 500 are described as follows with assumption that each segment width W is 32 pixels and each pixel has only one color represented by 8 bits of data (i.e., n=8), where n denotes the bit width of the input pixel s[k].

An input pixel s[k] of a current segment in a current LSDR image is fed to the subtractor 210 and then the subtractor 210 subtracts the value of a current predicted pixel p[k] from the value of the input pixel s[k] to obtain a difference value D, where k=0~31. Next, the quantizer 220 performs quantization over the difference value D based on a quantization step/parameter Q, such as calculating $\lfloor D/Q \rfloor$, to generate a quantized value delta, where the notation $\lfloor \ \rfloor$ denotes the floor function. However, division is not easy to implement in computer systems. Instead, a multiplication and a right shift are more easily implemented. In an embodiment, the following program codes and Equation 1 are provided to perform the quantization in the quantizer 220:

$$\Delta = \lfloor (|D| + \lfloor Q/2 \rfloor + 1) \times A/N \rfloor; // \qquad \text{Equation 1}$$

$$\text{delta} = D < 0 ? -\Delta : \Delta; // \text{if } D < 0, \text{delta} = -\Delta, \text{otherwise, delta} = \Delta$$

Here, N and A are integers. If the input pixel s[k] contains a n-bit data, then $N=2^n$. Since N is a power of two, the division operation is replaced by a right shift operation. For example, if N=4096, the numerator $((|D|+\lfloor Q/2 \rfloor+1)\times A)$ needs to be shifted right by twelve bits/times to obtain the $\Delta$ value.

FIG. 3 shows a relationship among the values of N, Q and A. The A value in FIG. 3 is an integer and must satisfy the following condition: (Q×A+1)=N. Upon selecting an A value, a selected N value must be equal to or greater than its corresponding $2^n$ value. For example, assuming that n=10 and Q=5, no A value is supported/found according to the third leftmost column in the table of FIG. 3. In this scenario, there are two options: selecting A=819 for the column of N=4096 or selecting A=13107 for the column of N=65536, so that both the corresponding N values are greater than $2^{10}$ (n=10).

FIG. 4 show a portion (the D value ranging from −3 to 14) of calculation results of different equations with the same quantization step/parameter Q=3, where Equation 3 ($\pm \lfloor (|D|+\lfloor Q/2 \rfloor)\times 341/1024 \rfloor$) is conventional and Equation 1 is calculated by N=4096 and A=1365. The second row of the table in FIG. 4 shows straightforward calculation results of $\lfloor D/Q \rfloor$. Equation 2 ($\pm \lfloor (|D|+\lfloor Q/2 \rfloor)/Q \rfloor$) is modified version derived from $\lfloor D/Q \rfloor$. As can be observed from the table in FIG. 4, in comparison with the quotients in the second row, the results in the third row (Equation 2) are more "evenly distributed" and all the groups are centered at the multiples of 3. To approach the calculation results of Equation 2, Equation 3 has been previously published. However, many data in the third and the fourth rows clearly mismatch and the data around D=0 in the fourth row for Equation 3 are not evenly distributed. By contrast, the data in the third and the fifth rows in FIG. 4 for Equation 2 and Equation 1 perfectly match. The infallible correctness and even distribution of the calculation results of Equation 1 of the invention minimize the quantization error and facilitate the progress of lossless compression/decompression. Here, the quantization error refers to the difference between the difference value D and its quantized value delta.

Referring back to FIG. 2, the VLC 230 encodes a sequence of the quantized values delta using a run value coding method of the invention to generate an encoded bitstream. In this specification, the term "zero-run (ZR)" refers to the number of consecutive occurrences of zeros that either precede a following non-zero value in the sequence of the quantized values delta or are arranged in the end of the sequence of the quantized values delta. Table 1 show a code table for different ZRs (i.e., different numbers of consecutive occurrences of zeros).

TABLE 1

|  | codeword |
| --- | --- |
| Zero-run(ZR) = 0 | 1'b0 |
| Zero-run(ZR) = 1 | 2'b10 |
| Zero-run(ZR) = 2 | 3'b110 |
| ESC-run(ER) = 3 | 4'b1110 |
| EOS | 4'b1111 |

In Table 1, the term "End of Segment (EOS)" refers to the rest of values equal to zeros in the sequence of the quantized values delta; the term "ESC-run (ER)" refers to a predefined number of consecutive occurrences of zeros so that if ZR is equal to or greater than ER, then the ZR consecutive zeros would be encoded by ER together with the rest (ZR-ER) of consecutive zeros in the sequence of the quantized values delta. For example, seven consecutive zeros (ZR=7 and ER=3) in the sequence would be represented/encoded by {3, 3, 1}, i.e., 10'b1110111010. In Table 1, the five codewords are five unary codes that respectively correspond no zeros, one zero, two zeros, three zeros and the rest values equal to zeros in the sequence of the quantized values delta. In Table 1, each codeword (i.e., each unary code) uses ZR ones followed by a zero to represent a corresponding ZR value. However, these are not limitations of the invention. In an alternative embodiment, each codeword (i.e., each unary code) may use ZR zeros followed by a one to represent a corresponding ZR value.

Table 2 show a code table for nonzero integers.

TABLE 2

| Value Set | Level | Codeword |
| --- | --- | --- |
| {+1, −1} | 0 | 2'b0s |
| {+2, −2, +3, −3} | 1 | 4'b10xs |
| {+4, −4, +5, −5, +6, −6, +7, −7} | 2 | 6'b110xxs |
| {+8, −8, +9, −9, +10, −10, +11, −11, +12, −12, +13, −13, +14, −14, +15, −15} | 3 | 8'b1110xxxs |
| ... | ... | ... |

In Table 2, x denotes 0 or 1, and s denotes the negative/positive sign of the delta value; besides, the greater the magnitude of delta, the greater the bit count/depth in the corresponding codeword. For example, if "s=+1" indicates a negative sign, then a delta value of −5 is encoded into the codeword "6'b110011" and a delta value of +8 is encoded into the codeword of "8'b11100000". Each codeword sequentially includes a level code, an index code and a sign code, where the level code is a unary code. For example, for a nonzero delta value of −9, its level q is encoded using unary coding to produce the level code of 4'b1110, where $q=\lfloor \log_2|-9|\rfloor=3$; express an integer C in binary format using q bits to form the index code of 3'b001, where $C=|-9|$ modulo $2^q=1$; finally, append a sign bit of 1 to the index code to form its codeword of 8'b11100011. In Table 2, the level code (i.e., the unary code) uses q ones followed by a zero to represent the level q, and the index code is arranged between the level code and the sign code in each codeword. However, these are not limitations of the invention. In an alternative embodiment, the level code (i.e., the unary code) may uses q zeros followed by a one to represent the level q; the sign code may be arranged between the level code and the index code in each codeword.

A feature of the run value coding method of the invention is to encode consecutive zeros and a non-zero integer in an alternate manner according to the code tables of Table 1 and Table 2. Stated in another way, the output of the VLC 230 consists of two tokens, repeated until the segment is complete. The two tokens are a first codeword for the number ZR of consecutive zeros as determined by Table 1, and a second codeword for a nonzero integer as determined by Table 2. For example, after receiving a sequence of the quantized values delta (a total of W quantized values) as follows: {+2, −3, 0, 0, 0, 1, 4, 0, 0, 0, 0 . . . , 0}, the VLC 230 treats (+2) as "ZR=0 plus (+2)" and then encodes them into "5'b01000 (=1'b0+4'b1000)"; the VLC 230 treats (−3) as "ZR=0 plus (−3)" and then encodes them into "5'b01011 (=1'b0+4'b1011)"; the VLC 230 treats {0, 0, 0, 1} as "ER=3, ZR=0 plus (+1)" and then encodes them into "7'b1110000 (=4'b1110+1'b0+2'b00)"; the VLC 230 treats the rest of zeros in the sequence: {0, 0, 0, . . . , 0} as "EOS" and then encodes them into a single codeword "4'b1111".

In an embodiment, the following program codes are provided to encode the sequence of the quantized values delta in the VLC 230:

```
main(void) {
   ZR =p= 0;
   while (p<W) {                    // W denotes the segment width
      if (seq[p]==0) ZR++;          // At first, count the number ZR of
   consecutive zeros; seq[.] denotes the sequence of the quantized values
   delta
      else {
         encode_ZR(ZR);             // Secondly, encode ZR
         ZR = 0;
         encode_value(seq[p]);      //Finally, encode a non-zero integer
      }
      p++;
   }
   if (ZR>0) output '1111';         // It indicates an EOS event
}
encode_ZR(int ZR){
   while (ZR>=3){
      output '1110';                // It indicates an ER event
      ZR-=3;                        // check ZR every three zeros
   }
   if (ZR==0) output '0';           // see codewords in Table 1
   else if (ZR==1) output '10';
   else if (ZR==2) output '110';
}
encode_Value (int value) {
   If (value<0) sign=1;
   else sign=0;
```

-continued

```
V = abs(value);
Le = 0;                    // Le denotes a Level
bound = 2;
While (1) {
if (V < bound) break;
   bound = bound*2;
   Le=Le+1;
}
Base = bound/2;
Index = V - Base;
output Le consecutive '1';     // see codewords in Table 2
output '0';                    // output level code
output 'Index' with Le bits;   // output index code
output 'sign' with one bit;    //output sign code
}
```

Afterward, the multiplier 270 multiplies each delta value by Q to produce a product cp, and then the adder 260 adds the product cp and the current predicted value p[k] to obtain a sum V. Next, the clipper 240 receives the sum V based on a minimum Mi and a maximum Ma to generate a current reconstructed pixel r[k]. Thus, Mi<=r[k]<=Ma.

In an embodiment, the following program codes are provided to perform prediction in the predictor 250:

$$p[k]=k<=1?(bx==0?dc:r[W-2+k]):r[k-2];$$

(bx, by) are the coordinates of the leftmost pixel of the current segment in the current LSDR image, W is the width of the current segment and $dc=2^{n-1}$, where bx=0~(Wi−1) and by=0~(Hi−1). Wi and Hi respectively denote the width and the height of each LSDR image. The above programs for prediction take the following steps: (1) When k>1, the second immediately preceding reconstructed pixel r[k−2] is assigned to a current predicted pixel p[k] (if k>1, then p[k]=r[k−2]). (2) If k<=1, then check whether bx is equal to 0. (3) If bx is equal to 0, it indicates the current segment is arranged at the leftmost side of the current LSDR image. Thus, set $p[k]=dc=2^{n-1}$. (4) If bx≠0 and k<=1, set p[k]=r[W−2+k], where r[W] is a sharing, overwritable and one-dimensional array of size W. If bx≠0, it indicates the current segment is not arranged at the leftmost side of the current LSDR image.

Figure 5:
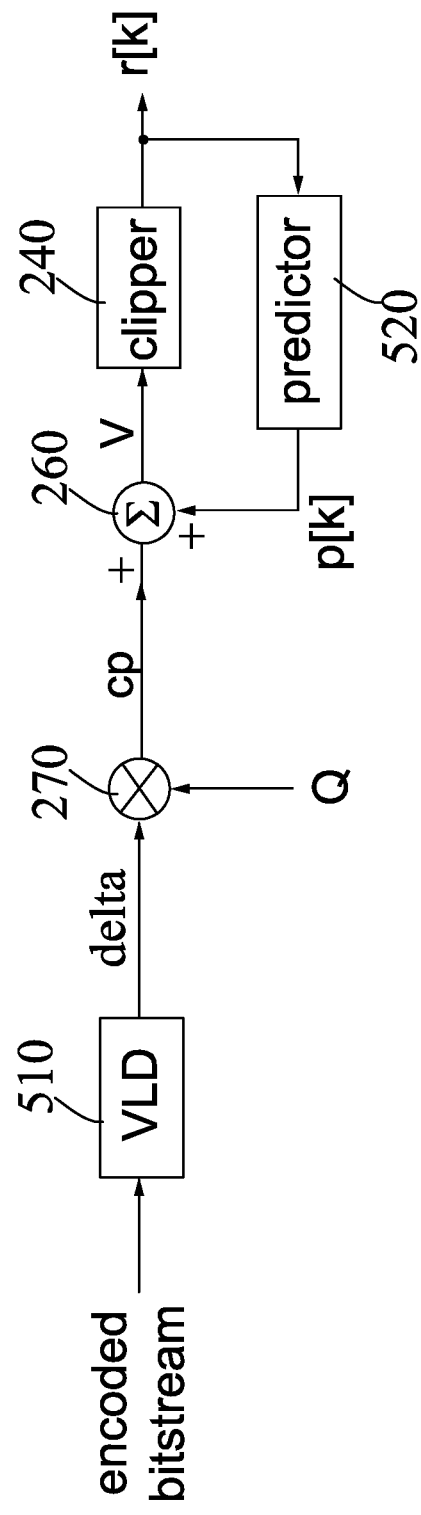
FIG. 5 is a schematic diagram showing a segment decoder 500 for Bayer pattern images according to an embodiment of the invention.

FIG. 5 is a schematic diagram showing a segment decoder 500 for Bayer pattern images according to an embodiment of the invention. Referring to FIG. 5, the segment decoder 500 of the invention includes a variable length decoder (VLD) 510, a clipper 240, a predictor 520, an adder 260 and a multiplier 270. The segment decoder 500 performs a decoding process generally reciprocal to the encoding process described with respect to the segment encoder 200. The VLD 510 compares a front/leading bit pattern of an encoded bitstream with all codewords in Table 1 and Table 2 in an alternate manner to generate a decoded numeral delta being either a string of consecutive zeros or a nonzero integer in a sequence of decoded data. In other words, the VLD 510 firstly compares a front/leading bit pattern of an encoded bitstream with all codewords in Table 1 to generate a corresponding decoded numeral delta, and then compares a next front/leading bit pattern of the encoded bitstream with all codewords in Table 2 to generate a corresponding decoded numeral delta. In this manner, the process is repeated until the whole encoded bitstream is processed (please refer to the program codes below for details).

The operations and structures of the predictors 250 and 520 are similar. For example, the following program codes are provided to perform prediction in the predictor 520:

$$p[k]=k<=1?(ax==0?dc:r[W-2+k]):r[k-2];$$

(ax, ay) are the coordinates of the leftmost pixel of the current reconstructed segment in the current decompressed/reconstructed LSDR image, k denotes an index number of the current reconstructed pixel in the current reconstructed segment, W is the width of the current reconstructed segment and $dc=2^{n-1}$, where k=0~(W−1), ax=0~(Wi−1) and ay=0~(Hi−1). Wi and Hi respectively denotes the width and the height of each reconstructed LSDR image. The above programs for prediction in the predictor 520 take the following steps: (1) When k>1, the second immediately preceding reconstructed pixel r[k−2] is assigned to a current predicted pixel p[k] (if k>1, then p[k]=r[k−2]). (2) If k<=1, then check whether ax is equal to 0. (3) If ax is equal to 0, it indicates the current reconstructed segment is arranged at the leftmost side of the current reconstructed LSDR image. Thus, set $p[k]=dc=2^{n-1}$. (4) If ax≠0 and k<=1, set p[k]=r[W−2+k], where r[W] is a sharing, overwritable and one-dimensional array of size W. If ax≠0, it indicates the current reconstructed segment is not arranged at the leftmost side of the current reconstructed LSDR image.

The rest components (240, 260 and 270) in the segment decoder 500 operate as the same manner as those operate in the segment encoder 200. Finally, the segment decoder 500 outputs the current reconstructed pixel r[k] in the current reconstructed segment. Thirty-two reconstructed pixels (W=32) form one reconstructed segment and then a set of reconstructed segments form one reconstructed LSDR image. In an embodiment, the following program codes are provided to decode the encoded bitstream in the VLD 510:

```
main(void) {
   p = 0;
   while (p<W) {                              // W denotes the segment width
       {ZR,EOS} = Decode_Run_EOB( );           //consecutive zeros are firstly
   obtained by decoding; return ZR and EOS
       if (EOS) break;                         //exit the while loop if the EOS flag is set
       for (i=0; i<ZR; i++) {                  // decoded value=zeros if ZR>0
           seq[p] = 0;
           p++;
       }
```

```
            {value} = Decode_Value( );         // a nonzero integer is then obtained
by decoding; value=a nonzero integer
            seq[p] = value;
            p++;
      }
      while (p<W) {
            seq[p] = 0;                       //It indicates an EOS event
            p++;
      }
}
Decode_Run_EOB( ){
   Z=peep(4, ptr);   // read four bits from the current address ptr and
assign the read value to Z without changing ptr; Z is a 4-bit variable; ptr is a
pointer/address that points to the beginning of the encoded bitstream;
      EOS = 0;
      ZR = 0;
      If (Z=='1111') {
            fetch(4, ptr);  // read four bits from the current address ptr and
      then change ptr to (ptr+4)
            EOS=1;
            exit;
      }
      else {
            do {
               If (Z=='0xxx')
                  ZR = ZR+0;
               else if (Z=='10xx')
                  ZR=ZR+1;
               else if (Z=='110x')
                  ZR=ZR+2;
               else //if (Z=='1110') {
                  ZR=ZR+3;
               fetch(4, ptr);   // read four bits from the current address ptr and
            then change ptr to (ptr+4)
               Z=peep(4, ptr);  // read four bits from the current address ptr
            and assign the read value to Z without changing ptr;
                  return ZR,EOS;
               }
      } while(Z=='1110')
      fetch (ZR+1, ptr);  // read (ZR+1) bits from the current address ptr and
      then change ptr to (ptr+(ZR+1))
      }
Decode_Value ( ) {
         Level = 0;
         do {
            X=peep(8, ptr);   // read 8 bits from the current address ptr and
assign the read value to Z without changing ptr; X is a 8-bit variable; ptr
is a pointer/address that points to the beginning of the encoded
bitstream;
            if (X=='0xxxxxxx')
            level=level+0;
            else if (X=='10xxxxxx')
               level=level+1;
            else if (X=='110xxxxx')
            level=level+2;
            else if (X=='1110xxxx')
               level=level+3;
            else if (X=='11110xxx')
               level=level+4;
            else if (X=='111110xx')
            level=level+5;
            else if (X=='1111110x')
            level=level+6;
            else if (X=='11111110')
               level=level+7;
         else {
            level = level+8;               // the number of consecutive ones are greater
      than or equal to 8
               fetch (8, ptr);             // read 8 bits from the current address ptr and
      then changing ptr to (ptr+8)
            }
      } while(X=='11111111');
index=fetch(level, ptr);                   // read level bits from the current address ptr,
assign the read value to "index" and then change ptr to (ptr+ level)
sign=fetch(1, ptr);   // read one bit from the current address ptr, assign
the read value to "sign" and then change ptr to (ptr+1)
```

```
value = (sign?-1:1)*((1<<level)+index);
return value;
}
```

In the above program codes, a function "peep (m, ptr)" denotes reading m bits from the current pointer/address ptr without changing ptr; a function "fetch (m, ptr)" denotes reading m bits from the current pointer/address ptr and then changing ptr to (ptr+m). ptr is a pointer/address that points to the beginning of the encoded bitstream.

In brief, the segment encoder 200 of the invention achieves a compression rate higher than or equal to 2×; in addition, the encoded bitstream from the segment encoder 200 can be mathematically reversed and decompressed in the segment decoder 500 to produce a high-quality reconstructed image that, to a human eye, appears identical to the input image (fed to the segment encoder 200). Further, both the coding process and the decoding process with the two code tables in Table 1 and Table 2 are simple and accurate.

The segment encoder 200 and the segment decoder 500 may be implemented by a software program, custom circuitry (e.g., field programmable gate arrays (FPGAs) or application specific integrated circuits (ASICs)), or by a combination of the custom circuitry and the software program. In an embodiment, the VLC 230 and the predictor 250 in the segment encoder 200 may be implemented using at least one first storage device and at least one first general-purpose processor; the VLD 510 and the predictor 520 in the segment decoder 500 may be implemented using at least one second storage device and at least one second general-purpose processor. The at least one first storage device stores a first processor-executable program and the second at least one first storage device stores a second processor-executable program. When the first processor-executable program is executed by the at least one first general-purpose processor, the at least one first general-purpose processor is configured to function as: the VLC 230 and the predictor 250. When the second processor-executable program is executed by the at least one second general-purpose processor, the at least one second general-purpose processor is configured to function as: the VLD 510 and the predictor 520.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A video encoding apparatus for Bayer pattern images, comprising:
    a quantizer configured to perform quantization over a difference value D between an input pixel and a current predicted pixel to generate a quantized value $\Delta$ in a quantization sequence based on a quantization parameter Q and the following equation: $\Delta = \lfloor (|D| + \lfloor Q/2 \rfloor + 1) \times A/N \rfloor$;
    a predictor coupled to the quantizer and configured to perform a set of first operations comprising: providing the current predicted pixel according to a position of a current segment in a current Bayer pattern image; and
    a variable-length coder coupled to the quantizer and configured to perform a set of second operations comprising: (1) counting a number ZR of consecutive zeros that either precede a following non-zero integer in the quantization sequence or are arranged in the end of the quantization sequence; (2) encoding the number ZR of consecutive zeros into a first codeword by a first codeword set; (3) encoding the following non-zero integer into a second codeword by a second codeword set; and, (4) repeating the second operations of (1) to (3) until all the quantized values in the quantization sequence are processed to produce an encoded bitstream;
    wherein A satisfies the following equation: $(Q \times A + 1) = N$, where $N = 2^d \geq 2^n$, n denotes a bit width of the input pixel and d is an integer.

2. The apparatus according to claim 1, further comprising:
    a subtractor coupled between the quantizer and the predictor for subtracting a value of the current predicted pixel from a value of the input pixel to generate the difference value D.

3. The apparatus according to claim 1, further comprising:
    a multiplier coupled to the quantizer and the variable-length coder for multiplying the quantized value by Q to generate a product; and
    an adder coupled between the multiplier and the predictor for adding the product and the current predicted pixel to generate a current reconstructed pixel.

4. The apparatus according to claim 1, wherein the first codeword set comprises a first unary code, a second unary code, a third unary code, a fourth unary code and a fifth unary code that respectively correspond no zeros, one zero, two zeros, three zeros and the rest quantized values equal to zeros in the quantization sequence, and wherein each unary code in the first codeword set has a length less than five bits.

5. The apparatus according to claim 4, wherein the second operation of (2) encoding the number ZR of consecutive zeros comprises:
    when ZR>=3 and the number ZR of consecutive zeros precede the following non-zero integer in the quantization sequence,
    (21) generating the fourth unary code as a part of the first codeword,
    (22) setting ZR to (ZR-3), and
    (23) repeating the second operations of (21) and (22) until ZR<3;
    when ZR=0 and the number ZR of consecutive zeros precede the following non-zero integer in the quantization sequence, generating the first unary code as a part of the first codeword;
    when ZR=1 and the number ZR of consecutive zeros precede the following non-zero integer in the quantization sequence, generating the second unary code as a part of the first codeword;
    when ZR=2 and the number ZR of consecutive zeros precede the following non-zero integer in the quantization sequence, generating the third unary code as a part of the first codeword; and
    when ZR>0 and the number ZR of consecutive zeros are arranged in the end of the quantization sequence, setting the first codeword to the fifth unary code.

6. The apparatus according to claim 1, wherein each codeword in the second codeword set comprises a level code and an index code, wherein the second operation of (3) encoding the following non-zero integer comprises:

encoding q using unary coding to produce the level code, where $q=\lfloor \log_2 |B| \rfloor$ and B denotes the following non-zero integer; and providing an integer C in binary format using (q+1) bits to form the index code, where C=|B| modulo $2^q$ and one bit selected from the index code having (q+1) bits is a sign bit that corresponds to a sign of B.

7. The apparatus according to claim 1, wherein the first operation of providing the current predicted pixel comprises:

providing the current predicted pixel having a value of a second immediately preceding reconstructed pixel when k>1;

providing the current predicted pixel having a value of $2^{n-1}$ when the current segment is disposed at the leftmost side of the current Bayer pattern image;

providing the current predicted pixel having a value of the second to last reconstructed pixel corresponding to an immediately preceding segment when the current segment is not disposed at the leftmost side of the current Bayer pattern image and k=0; and providing the current predicted pixel having a value of the last reconstructed pixel corresponding to the immediately preceding segment when the current segment is not disposed at the leftmost side of the current Bayer pattern image and k=1;

wherein k denotes an index number of the input pixel in the current segment.

8. A video encoding method for Bayer pattern images, comprising the steps of:

performing quantization over a difference value D between an input pixel and a current predicted pixel to generate a quantized value Δ in a quantization sequence based on a quantization parameter Q and the following equation: $\Delta=\lfloor (|D|+\lfloor Q/2 \rfloor +1) \times A/N \rfloor$;

providing a current predicted pixel according to a position of a current segment in a current Bayer pattern image;

counting a number ZR of consecutive zeros that either precede a following non-zero integer in the quantization sequence or are arranged in the end of the quantization sequence;

encoding the number ZR of consecutive zeros into a first codeword by a first codeword set;

encoding the following non-zero integer into a second codeword by a second codeword set; and repeating the steps of counting, encoding the number ZR of consecutive zeros and encoding the following non-zero integer until all the quantized values in the quantization sequence are processed to produce an encoded bitstream;

wherein A satisfies the following equation: (Q×A+1)=N, where $N=2^d \geq 2^n$, n denotes a bit width of the input pixel and d is an integer.

9. The method according to claim 8, further comprising: subtracting a value of the current predicted pixel from a value of the input pixel to generate the difference value D.

10. The method according to claim 8, further comprising: multiplying the quantized value by Q to generate a product; and adding the product and the current predicted pixel to generate a current reconstructed pixel.

11. The method according to claim 8, wherein the first codeword set comprises a first unary code, a second unary code, a third unary code, a fourth unary code and a fifth unary code that respectively correspond no zeros, one zero, two zeros, three zeros and the rest quantized values equal to zeros in the quantization sequence, and wherein each unary code in the first codeword set has a length less than five bits.

12. The method according to claim 11, wherein the step of encoding the number ZR of consecutive zeros comprises:

when ZR>=3 and the number ZR of consecutive zeros precede the following non-zero integer, (a) providing the fourth unary code as a part of the first codeword, (b) setting ZR to (ZR−3), and (c) repeating the steps of (a) and (b) until ZR<3;

when ZR=0 and the number ZR of consecutive zeros precede the following non-zero integer, providing the first unary code as a part of the first codeword;

when ZR=1 and the number ZR of consecutive zeros precede the following non-zero integer, providing the second unary code as a part of the first codeword;

when ZR=2 and the number ZR of consecutive zeros precede the following non-zero integer, providing the third unary code as a part of the first codeword; and when ZR>0 and the number ZR of consecutive zeros are arranged in the end of the quantization sequence, setting the first codeword to the fifth unary code.

13. The method according to claim 8, wherein each codeword in the second codeword set comprises a level code and an index code, wherein the step of encoding the following non-zero integer comprises:

encoding q using unary coding to obtain the level code, where $q=\lfloor \log_2 |B| \rfloor$ and B denotes the following non-zero integer; and providing an integer C in binary format using (q+1) bits to form the index code, where C=|B| modulo $2^q$ and one bit selected from the index code having (q+1) bits is a sign bit, and the sign bit corresponds to a sign of B.

14. The method according to claim 8, wherein the step of providing the current predicted pixel comprises:

providing the current predicted pixel having a value of a second immediately preceding reconstructed pixel when k>1;

providing the current predicted pixel having a value of $2^{n-1}$ when the current segment is disposed at the leftmost side of the current Bayer pattern image;

providing the current predicted pixel having a value of the second to last reconstructed pixel corresponding to an immediately preceding segment when the current segment is not disposed at the leftmost side of the current Bayer pattern image and k=0; and providing the current predicted pixel having a value of the last reconstructed pixel corresponding to the immediately preceding segment when the current segment is not disposed at the leftmost side of the current Bayer pattern image and k=1;

wherein k denotes an index number of the input pixel in the current segment.

15. A video decoding apparatus for Bayer pattern images, comprising:

a variable-length decoder configured to perform a set of first operations comprising: comparing a front bit pattern in an encoded bitstream with all codewords of a first codeword set and a second codeword set in an alternate manner to generate a decoded numeral being either a group of consecutive zeros or a nonzero integer; and a predictor coupled to the variable-length decoder and configured to perform a set of second operations comprising: providing a current predicted pixel according to a position of a current reconstructed segment in a current reconstructed Bayer pattern image.

16. The apparatus according to claim 15, further comprising:
a multiplier coupled to the variable-length decoder for multiplying the decoded numeral by a quantization parameter to generate a product; and
an adder coupled between the multiplier and the predictor for adding the product and the current predicted pixel to generate a current reconstructed pixel in the current reconstructed segment.

17. The apparatus according to claim 15, wherein the first codeword set comprises multiple unary codes that have a length less than five bits and correspond to different numbers of consecutive zeros for the decoded numeral, and wherein each codeword in the second codeword set comprises a level code and an index code.

18. The apparatus according to claim 17, wherein the first codeword set comprises a first unary code, a second unary code, a third unary code and a fourth unary code that respectively correspond to no zeros, one zero, two zeros and three zeros for the decoded numeral, and the first codeword set further comprises a fifth unary code that correspond to consecutive zeros for the rest decoded numerals associated with the current reconstructed segment.

19. The apparatus according to claim 18, wherein the first operation of comparing further comprises:
resetting ZR, wherein ZR denotes a number of consecutive zeros;
comparing the front bit pattern having four bits with the five unary codes in the first codeword set;
when the front bit pattern matches the fifth unary code, setting the rest decoded numerals associated with the current reconstructed segment to zeros;
when the front bit pattern matches the fourth unary code, (1) incrementing ZR by three, (2) removing four bits from the beginning of the encoded stream to update the front bit pattern and (3) repeating the first operations of (1) and (2) until the front bit pattern does not match the fourth unary code;
when the front bit pattern matches the first unary code, keeping ZR unchanged;
when the front bit pattern matches the second unary code, incrementing ZR by one;
when the front bit pattern matches the third unary code, incrementing ZR by two; and
providing the decoded numeral having ZR consecutive zeros when ZR>0.

20. The apparatus according to claim 17, wherein the first operation of comparing further comprises:
counting a number $L_N$ of consecutive predefined bit values in the front bit pattern to obtain the level code, where the level code is a unary code;
removing ($L_N$+1) bits from the beginning of the encoded stream to provide a following front bit pattern having ($L_N$+1) bits as the index code; and
obtaining the decoded numeral according to the level code and the index code;
wherein one bit selected from the index code having ($L_N$+1) bits is a sign bit.

21. The apparatus according to claim 15, wherein the second operation of providing the current predicted pixel comprises:
providing the current predicted pixel having a value of the second immediately preceding reconstructed pixel when k>1;
providing the current predicted pixel having a value of $2^{n-1}$ when the current reconstructed segment is disposed at the leftmost side of the current reconstructed Bayer pattern image;
providing the current predicted pixel having a value of the second to last reconstructed pixel corresponding to an immediately preceding reconstructed segment when the current reconstructed segment is not disposed at the leftmost side of the current reconstructed Bayer pattern image and k=0; and
providing the current predicted pixel having a value of the last reconstructed pixel corresponding to the immediately preceding reconstructed segment when the current reconstructed segment is not disposed at the leftmost side of the current reconstructed Bayer pattern image and k=1;
wherein k denotes an index number of the current reconstructed pixel in the current reconstructed segment.

22. A video decoding method for Bayer pattern images, comprising:
comparing a front bit pattern in an encoded bitstream with all codewords of a first codeword set and a second codeword set in an alternate manner to generate a decoded numeral being either a group of consecutive zeros or a nonzero integer; and
providing a current predicted pixel according to a position of a current reconstructed segment in a current reconstructed Bayer pattern image.

23. The method according to claim 22, further comprising:
multiplying the decoded numeral by a quantization parameter to generate a product; and
adding the product and the current predicted pixel to generate a current reconstructed pixel in the current reconstructed segment.

24. The method according to claim 22, wherein the first codeword set comprises first unary codes that have a length less than five bits and correspond to different numbers of consecutive zeros for the decoded numeral, and wherein each codeword in the second codeword set comprises a level code and an index code.

25. The method according to claim 24, wherein the first codeword set comprises a first unary code, a second unary code, a third unary code and a fourth unary code that respectively correspond to no zeros, one zero, two zeros and three zeros for the decoded numeral, and the first codeword set further comprises a fifth unary code that correspond to consecutive zeros for the rest decoded numerals associated with the current reconstructed segment.

26. The method according to claim 25, wherein the step of comparing further comprises:
resetting ZR, wherein ZR denotes a number of consecutive zeros;
comparing the front bit pattern having four bits with the five unary codes in the first codeword set;
when the front bit pattern matches the fifth unary code, setting values of the rest decoded numerals associated with the current reconstructed segment to zeros;
when the front bit pattern matches the fourth unary code, (1) incrementing ZR by three, (2) removing four bits from the beginning of the encoded stream to update the front bit pattern and (3) repeating the steps of (1) and (2) until the front bit pattern does not match the fourth unary code;
when the front bit pattern matches the first unary code, keeping ZR unchanged;

when the front bit pattern matches the second unary code, incrementing ZR by one;

when the front bit pattern matches the third unary code, incrementing ZR by two; and providing the decoded numeral having ZR consecutive zeros when ZR>0.

27. The method according to claim 24, wherein the step of comparing further comprises:

counting a number $L_N$ of consecutive predefined bit values in the front bit pattern to obtain the level code, where the level code is a unary code;

removing ($L_N$+1) bits from the beginning of the encoded stream to provide a following front bit pattern having ($L_N$+1) bits as the index code; and obtaining the decoded numeral according to the level code and the index code;

wherein one bit selected from the index code having ($L_N$+1) bits is a sign bit.

28. The method according to claim 22, wherein the step of providing the current predicted pixel comprises:

providing the current predicted pixel having a value of the second immediately preceding reconstructed pixel when k>1;

providing the current predicted pixel having a value of $2^{n-1}$ when the current reconstructed segment is disposed at the leftmost side of the current reconstructed Bayer pattern image;

providing the current predicted pixel having a value of the second to last reconstructed pixel corresponding to an immediately preceding reconstructed segment when the current reconstructed segment is not disposed at the leftmost side of the current reconstructed Bayer pattern image and k=0; and providing the current predicted pixel having a value of the last reconstructed pixel corresponding to the immediately preceding reconstructed segment when the current reconstructed segment is not disposed at the leftmost side of the current reconstructed Bayer pattern image and k=1;

wherein k denotes an index number of the current reconstructed pixel in the current reconstructed segment.

* * * * *